United States Patent
Zhelev et al.

(10) Patent No.: US 9,027,026 B2
(45) Date of Patent: May 5, 2015

(54) MANAGING TRANSACTIONS WITHIN AN APPLICATION SERVER

(71) Applicants: Ivaylo Zhelev, Sofia (BG); Nikolay Samardzhiev, Sofia (BG); Peter K. Matov, Sofia (BG)

(72) Inventors: Ivaylo Zhelev, Sofia (BG); Nikolay Samardzhiev, Sofia (BG); Peter K. Matov, Sofia (BG)

(73) Assignee: SAP SE, Waldorf (DE)

( * ) Notice: Subject to any disclaimer, the term of this patent is extended or adjusted under 35 U.S.C. 154(b) by 223 days.

(21) Appl. No.: 13/673,492

(22) Filed: Nov. 9, 2012

(65) Prior Publication Data

US 2014/0137120 A1    May 15, 2014

(51) Int. Cl.
*G06F 9/46* (2006.01)
*G06F 11/14* (2006.01)

(52) U.S. Cl.
CPC ............ *G06F 9/466* (2013.01); *G06F 11/1474* (2013.01)

(58) Field of Classification Search
CPC .............................. G06F 9/466; G06F 9/4843
USPC ........................................................ 718/101
See application file for complete search history.

(56) References Cited

U.S. PATENT DOCUMENTS

| | | | |
|---|---|---|---|
| 2003/0217068 A1* | 11/2003 | Fruchtman et al. | 707/101 |
| 2005/0097555 A1* | 5/2005 | Tuel | 718/101 |
| 2005/0268136 A1* | 12/2005 | Kostadinov et al. | 713/400 |
| 2009/0113430 A1* | 4/2009 | Riley | 718/101 |
| 2011/0055376 A1* | 3/2011 | Little | 709/224 |

* cited by examiner

*Primary Examiner* — Emerson Puente
*Assistant Examiner* — Steven Do
(74) *Attorney, Agent, or Firm* — Schwegman Lundberg & Woessner, P.A.

(57) ABSTRACT

A system and method for managing transactions in an application server is described. In some example embodiments, the system registers to receive notifications from a timeout manager associated with a transaction (e.g., a database query). If the transaction becomes locked or runs longer than anticipated, the system receives a notification indicating a timeout event. The system, upon receiving the event notification, may then cancel the transaction or perform other actions to notify an application that initiated the transaction, such as via a newly created thread.

18 Claims, 6 Drawing Sheets

MANAGING TRANSACTIONS WITHIN AN APPLICATION SERVER

TECHNICAL FIELD

The subject matter disclosed herein generally relates to the processing of data and, more specifically, to managing transactions within an application server.

BACKGROUND

A database transaction is a sequence of SQL statements that a database system, such as an application server and a database, treats as a single group. A transaction moves a database from one consistent state to another. For a successful transaction, the database system performs a COMMIT, and all data changes that occurred during the transaction are retained in the database. For an unsuccessful transaction (e.g., an interruption), the database system performs a ROLLBACK, and reverts the database to its state before the transaction commenced by reversing all changes that occurred during the transaction.

Typically, when a Java Transactional Architecture (JTA) transaction times out or is otherwise unsuccessful, a Java Application Server will flag the transaction as a candidate for a rollback procedure, in order to preserve the consistency of the database fulfilling the transaction. However, the transaction may remain in a locked or long-running state, and cause or introduce problems associated with not completing database requests from applications, exhausting system resources, and other drawbacks.

BRIEF DESCRIPTION OF THE DRAWINGS

The present technology is illustrated by way of example, and not by way of limitation, in the figures of the accompanying drawings.

DETAILED DESCRIPTION

Overview

A system and method for managing transactions in an application server, such as by preventing locked and/or long-running transactions, is described. In some example embodiments, the system creates a new thread along with a currently running transaction, identifies a locked and/or long-running transaction, and cancels the identified transaction via the newly created thread.

For example, the system may register to receive notifications from a timeout manager associated with a transaction (e.g., a database query). If the transaction becomes locked or runs longer than anticipated, the system receives a notification indicating a timeout event. The system, upon receiving the event notification, may then cancel the transaction vis the newly created thread, or perform other actions to notify an application or resource that initiated the transaction that the transaction is locked or in a long-running state.

Thus, in some example embodiments, a transaction manager, or a stand-alone component within or outside of an application server, may be configured to monitor a transaction and identify a timeout condition associated with the transaction without causing an asyncronous condition within an application server, (which may lead to performance overhead, race conditions, and so on). Instead, by establishing a new and unobstusive thread, parallel to a running transaction, which is used to monitor the performance of the transaction, the system may prevent locked and/or long-running transactions using synchronization-free methods while maintaining the consistency of data involved in the transaction, among other benefits.

Furthermore, the system, in some example embodiments, may support the exposure of an interface that enables resource adapter vendors to utilize an application server to cancel transactions and other activities. For example, the system may expose an interface, such as one or more APIs, to non-Java resources, enabling these resources to utilize a Java Application Server when cancelling a locked or long-running transaction, such as a transaction running at a database.

In the following description, for purposes of explanation, numerous specific details are set forth to provide a thorough understanding of example embodiments. It will be evident to one skilled in the art, however, that the present subject matter may be practiced without these specific details.

Example System

Figure 1:
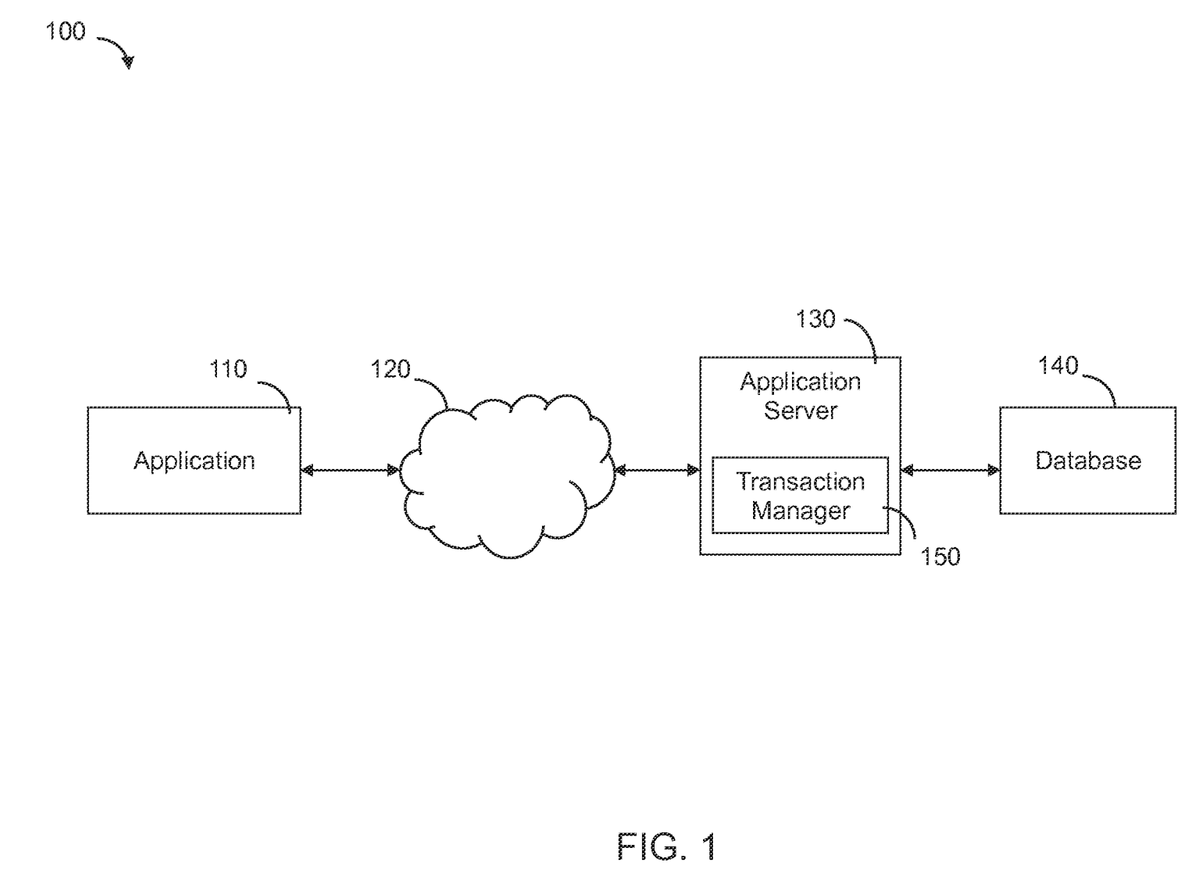
FIG. 1 is a network diagram illustrating a network environment for managing transactions in an application server, in some example embodiments.

FIG. 1 is a network diagram illustrating a network environment 100 for managing transactions in an application server, in some example embodiments. The network environment 100 includes an application device 110 that communicates with an application sever 130 over a network 120. The application server 130 communicates with one or more databases 140, and in some example embodiments, represents a database system. For example, the application server 130 may perform database transactions, such as database queries, in response to receiving a request from an application running on the application device 110.

In some example embodiments, the network environment 100 supports transactions performed under the Java Transaction Architecture (JTA) specification, where the application server 130 is a Java Application Server or other Web Application Server. The JTA enables applications operating on the application device 110 to define boundaries and other parameters associated with transactions performed by the resources supported by the application server 130 and the database 140 and/or other external systems, such as Java Virtual Machine Threads, database connections, Relational Database Management System (RDBMS) resources, and so on.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 6. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 120 may be any network that enables communication between or among machines, databases, and devices (e.g., the application device 110 and the application server 130). Accordingly, the network 120 may be a wired network, a wireless network (e.g., a mobile or cellular network), a storage area network (SAN), or any suitable combination thereof. The network 120 may include one or more portions of a private network, a public network (e.g., the Internet), or any suitable combination thereof.

In some example embodiments, the application server 130 includes a transaction manager 150 that is configured to prevent locked and/or long-running transactions within the application server 130. In addition, the transaction manager 150 ensures, among other things, that parallel transactions from multiple database sessions are processed correctly, delivering results identical to results that would occur if transactions were processed sequentially. For example, because competing transactions may access the same database objects, the transaction manager 150 may perform various Transaction Services, such as isolating individual transactions, flagging interrupted transactions, identifying and providing notifications for long-running transactions, and so on.

Managing Transactions

Figure 2:
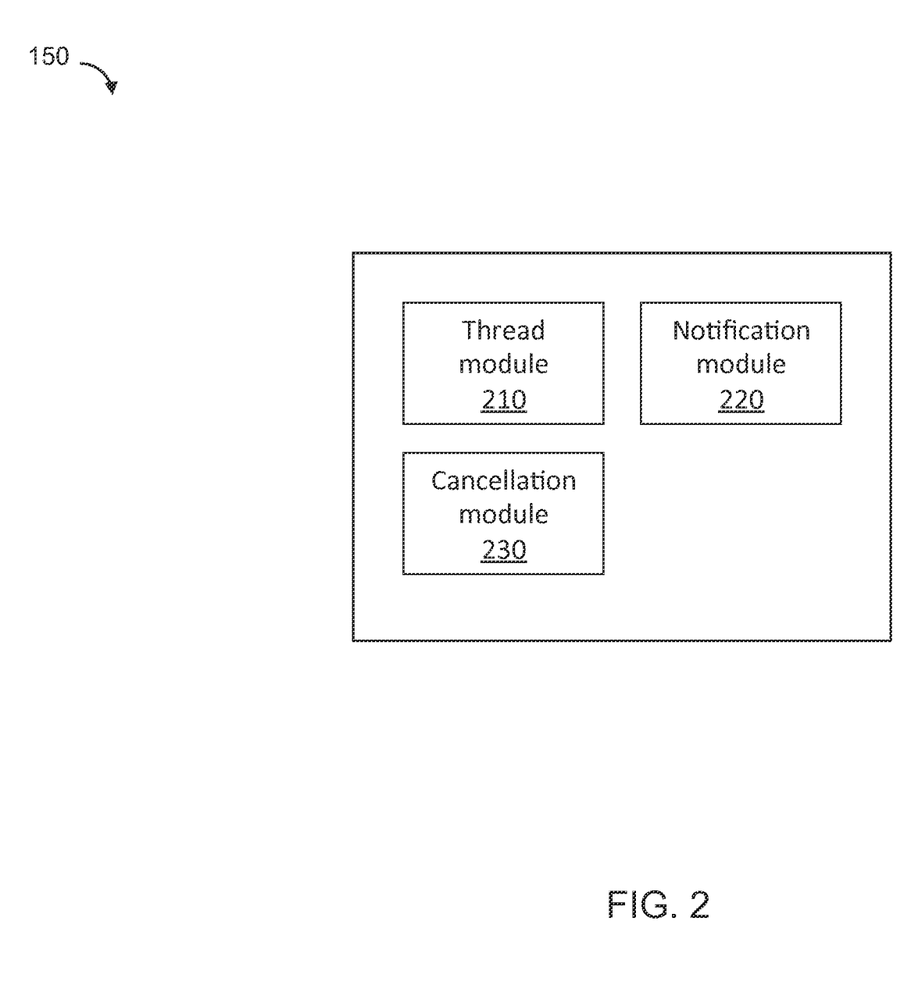
FIG. 2 is a block diagram illustrating components of a transaction manager configured to prevent locked and long-running transactions, in some example embodiments.

In some example embodiments, the transaction manager 150 includes components and/or modules configured to create threads along running transactions, identify timeout events associated with running transactions, perform actions to cancel transactions or otherwise notify applications about the timeout events, and so on. FIG. 2 is a block diagram illustrating components of a transaction manager 150 configured to prevent locked and long-running transactions, in some example embodiments.

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Further, one of ordinary skill in the art will realize that other resources and components within the network environment 100 may include modules depicted in FIG. 2, such as stand-alone components, other components within the application server 130, and so on.

In some example embodiments, the transaction manager 150 includes a thread module 210 that is configured and/or programmed to establish and/or create a thread, such as a thread associated with a running transaction. The created thread may be a unit that is assigned processor time by an operating system and/or any object established and configured to perform actions based on program instructions, such as actions to cancel a running transaction, actions to expose an interface to external systems and applications, and so on. In order words, the thread module 210 may create one or more threads for tasks that the transaction manager 150 requests to execute in parallel to one or more running transactions, such as tasks associated with cancelling locked and/or long-running transactions.

The transaction manager 150 may include, in some example embodiments, a notification module 220 configured and/or programmed to register for notifications with a timeout management component (e.g., a "TimeoutManager") within the transaction manager 150 and/or application server 130. For example, the notification module 220 may register with the TimeoutManager via the javax.transaction.TransactionManager interface in the Transaction Service of the JTA. The "TransactionTimeout" property of the Transaction Service enables a selection of a timeout value to ensure that a transaction may be terminated after a defined period. In some cases, the value of the property is associated with a number of running and/or hanging transactions. Thus, in registering with the TimeoutManager, the notification module 220 receives notifications for timeout events at or around the same time the transaction manager 150 receives the same notifications, without disrupting any running transactions and/or system resources monitoring and/or supporting the running transactions.

In some example embodiments, the cancellation module 230 is configured and/or programmed to perform actions in response to timeout events associated with running transactions, such as timeout events that indicate a locked and/or long-running transaction. For example, the cancellation module 230, in response to the notification module 220 receiving a notification of an timeout event at a running transaction, may utilize the thread created by the thread module 210 to cancel or otherwise stop the transaction from running.

In addition, the cancellation module 230, in some example embodiments, exposes an interface to a non-Java resource, which identifies a locked or long-running transaction, and provides the resource with a mechanism for cancelling the locked or long-running transaction via a Java Application Server. For example, the cancellation module 230 may publish an Application Programming Interface (API) that enables the resource to interact with and cancel or otherwise stop the locked or long-running transaction. In some example embodiments, the cancellation module 230 may generate and expose a user interface, enabling a user of a resource to manually cancel identified transactions based on information presented via the interface.

Figure 3:
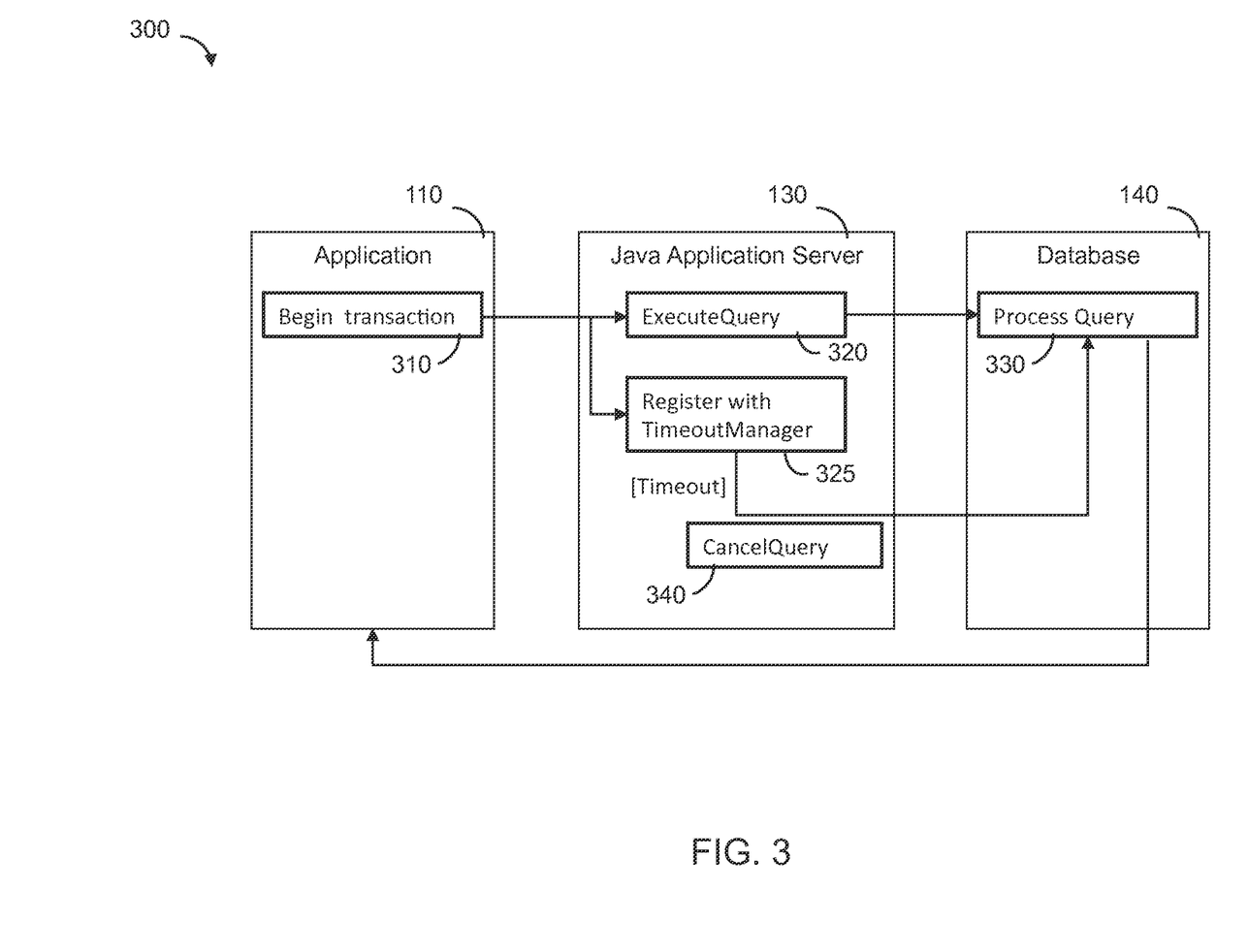
FIG. 3 is a block diagram illustrating the flow of data during the cancelling of a locked and/or long-running transaction, in some example embodiments.

By way of example, FIG. 3 is a block diagram 300 illustrating the flow of during the cancelling of a locked and/or tong-running transaction, in some example embodiments. An application at an application device 110 begins a long-running transaction 310, such as a database query. The application server 130 executes the query 320 at the database 140, which begins to process the query 330. At or around the same time, the application server 130 registers 325 with a TimeoutManager associated with the executing query. The query processing 330 elapses past a typical time frame for such a process, and the TimeoutManager sends an event notification of a timeout event associated with the query.

In some example embodiments, a single transaction may include multiple (e.g., several) queries. The application server 130 may register the transaction (a global transaction) with the TimeoutManager. In response to an event notification of a timeout event associated the global transaction, a localization mechanism identifies a currently executing query within the transaction and cancels the query (for an SQL query) and/or invokes a cancelExecution( ) operation. The system may then define the cancelExecution( ) operation via an exposed interface that is implemented by Resource Adapter vendors, enabling the vendors to cancel their underlying activities, among other things.

The system cancels the query 340, and the flow returns to the originating application 110 with an Exception, which identifies the transaction has timed out and the query was cancelled. Typically, the application receiving the Exception triggers a ROLLBACK of the transaction, and the application server 130 performs the requested ROLLBACK via the same application thread used to start the transaction. Therefore, the originating application makes the determination to rollback the transaction. That is, the application 110 triggers the rollback of the transaction, and the application server 130 detects the transaction timeout event, cancels the currently executing query (if any), and notifies the application with an Exception.

Figure 4:
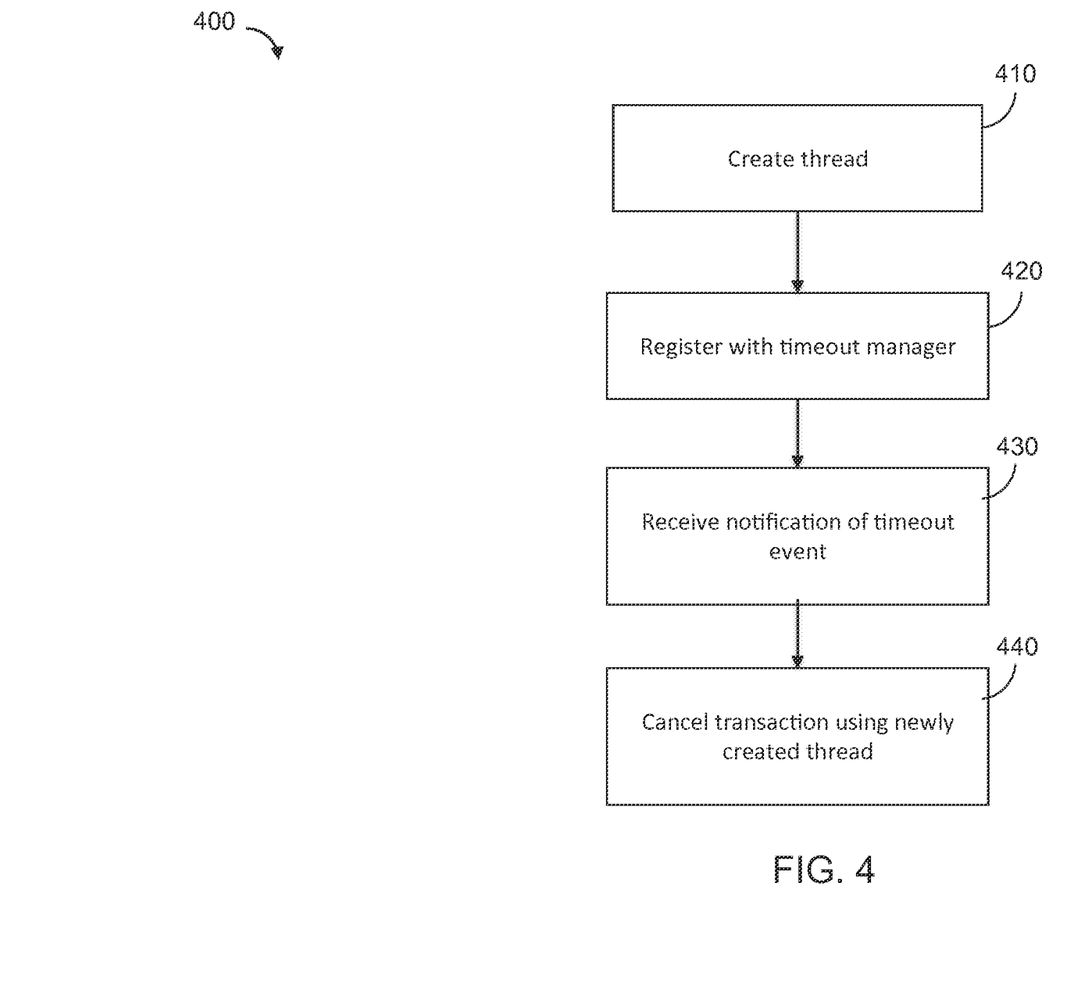
FIG. 4 is a flow diagram illustrating a method for cancelling a locked or long-running transaction, in some example embodiments.

As described herein, in some example embodiments, the transaction manager 150 includes various modules configured to perform methods and/or techniques associated with cancelling locked or long-running transactions. FIG. 4 is a flow diagram illustrating a method 400 for cancelling a locked or long-running transaction, in some example embodiments.

In operation 410, the system creates a thread, such as a database thread. For example, the system, via the thread module 210, creates a thread. The system may create one or more threads for tasks that the transaction manager 150 wishes to execute in parallel to a running transaction, such as tasks associated with cancelling a locked or long-running transaction.

In operation 420, the system registers with a timeout management component, such as a TimeoutManager of a transaction manager. For example, the system, via the notification module 220, executes a statement such as "registerTimeoutListener(Tx, Timeout)," which enables the notification module 220 to receive notifications of timeout events associated with the Tx transaction. In some example embodiments, the notification module 220 may also set parameters associated with a time period in which to execute a timeout for a running transactions.

In operation 430, the system receives a notification of a timeout event associated with the running transaction. For example, the system, via the notification module 220, receives an event notification that a running transaction has reached a timeout state (e.g., the duration of the transaction is longer than a time or parameter assigned to the transaction). In some example embodiments, the running transaction may be considered a locked and/or long-running transaction when the transaction reaches the timeout state.

In operation 440, the system cancels the transaction in response to receiving the notification. For example, the system, via the cancellation module 220, executes a CancelQuery statement, such as "java.sql.Statement.cancel(tx)," at a database that is processing the transaction. In some example embodiments, the application server 130 may perform a ROLLBACK once the transaction is cancelled, in order to preserver the consistency of the data that was changed during the unfinished transaction.

Figure 5:
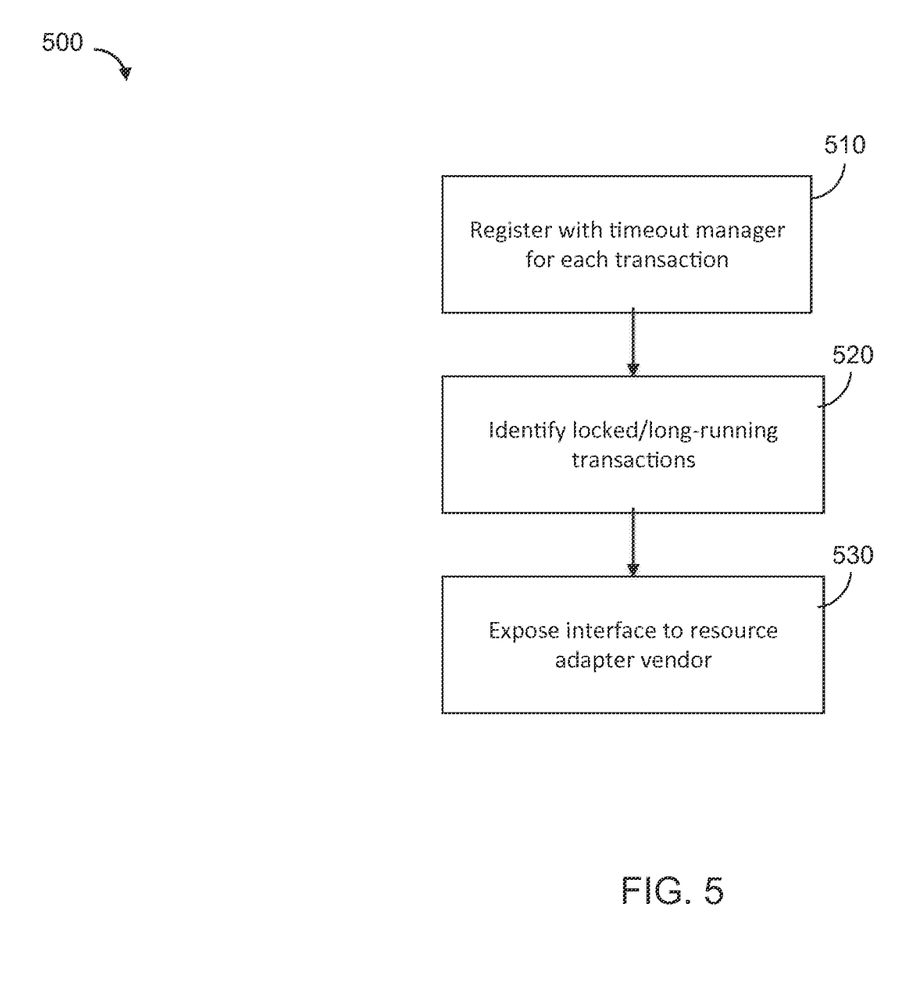
FIG. 5 is a flow diagram illustrating a method for presenting information identifying locked or long-running transactions, in some example embodiments.

As described herein, in some example embodiments, the transaction manager 150 includes various modules configured to perform methods and/or techniques associated with performing other actions associated with locked and/or long-running transactions. FIG. 5 is a flow diagram illustrating a method 500 for presenting information identifying locked or long-running transactions, in some example embodiments.

In operation 510, the system registers with a timeout manager for some or every transaction that executes on a resource, such as a database. For example, the system, via the notification module 220, may execute a statement of "registerTimeoutListener(T1, Timeout)" for a Transaction T1, execute a statement of "registerTimeoutListener(T2, Timeout)" for a Transaction T2, and so on.

In operation 520, the system identifies any locked and/or long-running transactions. For example, the system, via the notification module 220, may receive notifications for timeout events that occur at one or more running transactions, and identify a transaction as a locked and/or long-running transaction based on the received notifications.

In operation 530, the system exposes an interface indicating the identified locked and/or long-running transactions. For example, the system, via the cancellation module 230, exposes an interface to an application device 110 that initiated the transactions. The exposed interface may include various types of information, such as information identifying the locked or long-running transaction, information associated with a progress of the transaction, information associated with timeout conditions that triggered the timeout event, information comparing a transaction to other running transactions, and so on.

In response to the information presented by the exposed interface, a resource adapter vendor, such as a non-Java resource that utilizes the application server 130 to perform transactions within the database 140, may then interact with the interface to cancel (e.g., manually via a user interface or automatically via an API) a locked or long-running transaction. In some example embodiments, the system may also create a thread for every transaction that executes on a resource, and utilize the thread to cancel the transaction.

Therefore, in some example embodiments, the system may create threads and interact with a timeout management component of a transaction manager in order to identify and provide information to a third party resource that indicates the state of various database transactions controlled by the third party resource, such as whether a transaction is in a locked or long-running state, among other benefits.

Thus, the system described herein may cancel a transaction immediately after the transaction enters a timeout state, enabling a JTA environment to notify other systems (e.g., via various APIs) to end any current activities. Furthermore, the system may enable resource adapters, including non-Java resources, to leverage the techniques described herein without exhausting system resources, among other benefits.

Figure 6:
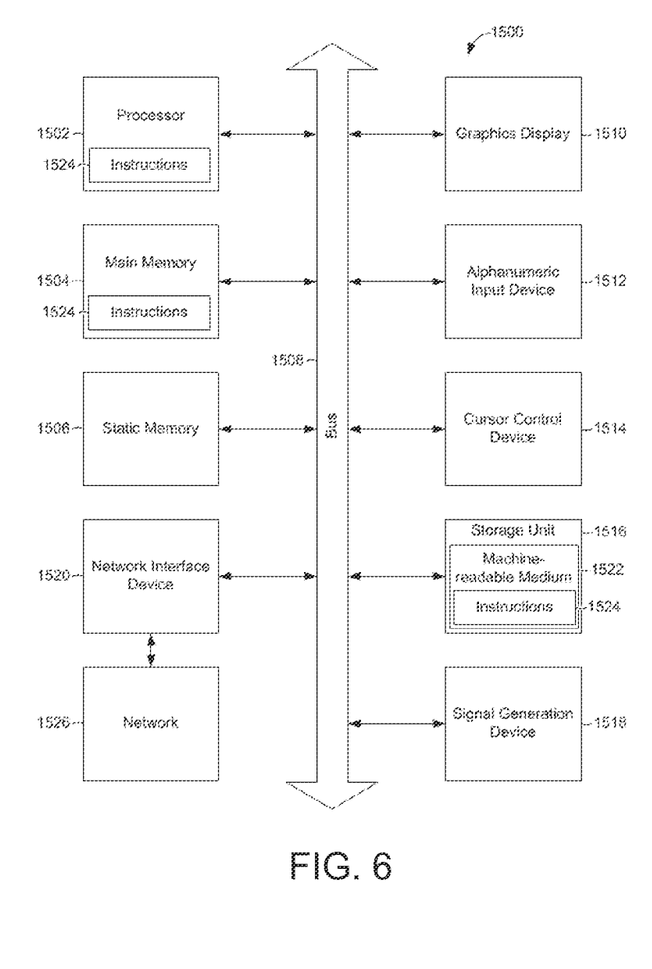
FIG. 6 is a block diagram illustrating components of a machine, according to some example embodiments, able to read instructions from a machine-readable medium and perform any one or more of the methodologies discussed herein.

FIG. 6 is a block diagram illustrating components of a machine 1500, according to some example embodiments, able to read instructions from a machine-readable medium (e.g., a machine-readable storage medium) and perform any one or more of the methodologies discussed herein, in whole or in part. Specifically, FIG. 6 shows a diagrammatic representation of the machine 1500 in the example form of a computer system and within which instructions 1524 (e.g., software, a program, an application, an applet, an app, or other executable code) for causing the machine 1500 to perform any one or more of the methodologies discussed herein may be executed. In alternative embodiments, the machine 1500 operates as a stand-alone device or may be connected (e.g., networked) to other machines. In a networked deployment, the machine 1500 may operate in the capacity of a server machine or a client machine in a server-client network environment, or as a peer machine in a peer-to-peer (or distributed) network environment. The machine 1500 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1524, sequentially or otherwise, that specify actions to be taken by that machine. Further, while only a single machine is illustrated, the term "machine" shall also be taken to include a collection of machines that individually or jointly execute the instructions 1524 to perform any one or more of the methodologies discussed herein.

The machine 1500 includes a processor 1502 (e.g., a central processing unit (CPU), a graphics processing unit (GPU), digital signal processor (DSP), application specific integrated circuit (ASIC), a radio-frequency integrated circuit (RFIC), or any suitable combination thereof), a main memory 1504, and a static memory 1506, which are configured to communicate with each other via a bus 1508. The machine 1500 may further include a graphics display 1510 (e.g., a plasma display panel (PDP), a light emitting diode (LED) display, a liquid crystal display (LCD), a projector, or a cathode ray tube (CRT)). The machine 1500 may also include an alphanumeric input device 1512 (e.g., a keyboard), a cursor control device 1514 (e.g., a mouse, a touchpad, a trackball, a joystick, a motion sensor, or other pointing instrument), a storage unit 1516, a signal generation device 1518 (e.g., a speaker), and a network interface device 1520.

The storage unit 1516 includes a machine-readable medium 1522 on which is stored the instructions 1524 embodying any one or more of the methodologies or functions described herein. The instructions 1524 may also reside, completely or at least partially, within the main memory 1504, within the processor 1502 (e.g., within the processor's cache memory), or both, during execution thereof by the machine 1500. Accordingly, the main memory 1504 and the processor 1502 may be considered as machine-readable media. The instructions 1524 may be transmitted or received over a network 1526 (e.g., network 120) via the network interface device 1520.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1522 or computer-readable medium is shown in an example embodiment to be a single medium, the term "machine-readable medium" or "computer-readable medium" should be taken to include a single medium or multiple media (e.g., a centralized or distributed database, or associated caches and servers) able to store instructions. The term "machine-readable medium" or "computer-readable medium" shall also be taken to include any medium, or combination of multiple media, that is capable of storing instructions for execution by a machine or computer (e.g., machine 1500), such that the instructions, when executed by one or more processors of the machine or computer (e.g., processor 1502), cause the machine or computer to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some example embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

We claim:

1. A method for processing database transactions, the method comprising:
    initiating, between an application server and a database, global transactions that each include two or more running queries;
    creating a thread between an application server and a database that is associated with one of the global transactions, the created thread executing in parallel with the corresponding global transaction for at least a portion of the execution time of the created thread;
    registering, via the created thread, with a timeout manager monitoring the corresponding global transaction; and
    cancelling at least one of the running queries by the created thread in response to the created thread receiving a notification of an occurrence of a timeout event associated with the corresponding global transaction from the timeout manager.

2. A method for processing a plurality of running transactions, comprising:
    creating a thread that is associated with a corresponding running transaction of the plurality of running transactions, the created thread executing in parallel with the corresponding running transaction for at least a portion of the execution time of the created thread;
    registering, via the created thread, with a timeout manager monitoring the corresponding running transaction; and
    cancelling the corresponding running transaction by the created thread in response to the created thread receiving a notification of an occurrence of a timeout event associated with the corresponding running transaction from the timeout manager.

3. The method of claim 2,
    wherein cancelling the corresponding running transaction based on the received notification includes cancelling the corresponding running transaction via the created thread.

4. The method of claim 2, wherein creating the thread that is associated with the corresponding running transaction includes:
    creating the thread that is associated with the corresponding running transaction before receiving the notification from the timeout manager; and
    wherein cancelling the corresponding running transaction based on the received notification includes cancelling the corresponding running transaction via the created thread.

5. The method of claim 2, wherein cancelling the corresponding running transaction based on the received notification is performed by an application server.

6. The method of claim 2, wherein the corresponding running transaction is a query of a SQL database.

7. The method of claim 2, further comprising:
    providing an Exception to an application associated with the cancelled transaction.

8. The method of claim 2, wherein cancelling the corresponding running transaction includes a transaction manager automatically cancelling the corresponding running transaction in response to receiving the notification from the timeout manager, wherein the transaction manager comprises the created thread.

9. The method of claim 2, wherein registering with the timeout manager monitoring the corresponding running transaction includes selecting a value for a timeout condition that triggers the occurrence of the timeout event.

10. A system for processing a plurality of running transactions, comprising:
   a thread module, implemented by a processor, that is configured to create a thread for a corresponding running transaction of the plurality of running transactions;
   a notification module, implemented by the processor, that is configured to register via the created thread with a timeout manager monitoring the corresponding running transaction, the created thread executing in parallel with the corresponding running transaction for at least a portion of the execution time of the created thread; and
   a cancellation module, implemented by the processor, that is configured to cancel the corresponding running transaction by the created thread in response to the created thread receiving a notification of an occurrence of a timeout event associated with the corresponding running transaction from the timeout manager.

11. The system of claim 10, wherein cancelling the corresponding running transaction based on the received notification includes cancelling the corresponding running transaction via the created thread.

12. The system of claim 10, wherein the cancellation module is configured to expose an interface to a resource that initiated the corresponding running transaction.

13. The system of claim 10, wherein the notification module and the cancellation module are located within a transaction manager configured to monitor transactions running between an application server that supports the transaction manager and a database that processes the corresponding running transaction.

14. The system of claim 10, wherein the notification module and the cancellation module are located within an application server that supports a transaction manager and a database that processes the corresponding running transaction.

15. A non-transitory computer-readable storage medium whose contents, when executed by a computing system, cause the computing system to perform operations for managing database transactions, the operations comprising:
   for one or more transactions associated with an application, registering with a transaction manager monitoring running transactions between an application server and a database;
   identifying one or more long-running transactions based on information received from the transaction manager;
   creating a thread associated with a corresponding long-running transaction of the identified one or more long-running transactions; and
   performing an action associated with the corresponding long-running transaction by the created thread in response to the created thread receiving a notification of an occurrence of a timeout event associated with the corresponding long-running transaction from a timeout manager, the created thread executing in parallel with the corresponding long-running transaction for at least a portion of the execution time of the created thread.

16. The computer-readable storage medium of claim 15, wherein the identifying one or more long-running transactions based on information received from the transaction manager includes identifying a long-running transaction based on receiving the notification of the timeout event associated with the long-running transaction.

17. The computer-readable storage medium of claim 15, wherein performing the action associated with the corresponding long-running transaction includes cancelling the corresponding long-running transaction via the created thread.

18. The computer-readable storage medium of claim 15, wherein performing the action associated with the corresponding long-running transaction includes exposing an interface that identifies the corresponding long-running transaction.

* * * * *